United States Patent
Subramanian et al.

(10) Patent No.: US 12,039,169 B2
(45) Date of Patent: Jul. 16, 2024

(54) BANDWIDTH-AWARE FABRIC TRAFFIC SHAPING

(71) Applicant: Apple Inc., Cupertino, CA (US)

(72) Inventors: Anjana Subramanian, Sunnyvale, CA (US); Rohit Natarajan, Sunnyvale, CA (US); Yu Simon Zhang, San Jose, CA (US); Mukul A. Joshi, Fremont, CA (US); Harshavardhan Kaushikkar, Santa Clara, CA (US); Jeonghee Shin, Sunnyvale, CA (US); Srinivasa Rangan Sridharan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/900,613

(22) Filed: Aug. 31, 2022

(65) Prior Publication Data

US 2023/0325086 A1 Oct. 12, 2023

Related U.S. Application Data

(60) Provisional application No. 63/328,338, filed on Apr. 7, 2022.

(51) Int. Cl.
*G06F 3/06* (2006.01)
(52) U.S. Cl.
CPC .......... *G06F 3/0611* (2013.01); *G06F 3/0655* (2013.01); *G06F 3/0683* (2013.01)

(58) Field of Classification Search
CPC ...... G06F 3/0611; G06F 3/061; G06F 3/0655; G06F 3/0683; G06F 3/0613; G06F 13/14; G06F 13/1605; G06F 13/161; G06F 13/4031

See application file for complete search history.

(56) References Cited

U.S. PATENT DOCUMENTS

| | | | |
|---|---|---|---|
| 6,385,678 B2 | 5/2002 | Jacobs et al. | |
| 8,032,678 B2 | 10/2011 | Tardieux et al. | |
| 8,842,529 B2 | 9/2014 | Das et al. | |
| 8,943,249 B2 * | 1/2015 | Kwon | G06F 13/4022 710/316 |
| 10,353,747 B2 | 7/2019 | Luan et al. | |
| 10,482,934 B2 | 11/2019 | Teh | |
| 10,649,813 B2 | 5/2020 | Schmisseur et al. | |
| 11,093,425 B2 | 8/2021 | Chidambaram Nachiappan et al. | |
| 2009/0037635 A1 | 2/2009 | Chou et al. | |
| 2011/0242974 A1 * | 10/2011 | Das | H04L 47/70 370/230 |

(Continued)

OTHER PUBLICATIONS

Hower, Derek R., Harold W. Cain, and Carl A. Waldspurger. "Pabst: Proportionally allocated bandwidth at the source and target." In 2017 IEEE International Symposium on High Performance Computer Architecture (HPCA), pp. 505-516. IEEE, 2017.*

*Primary Examiner* — Tracy A Warren
(74) *Attorney, Agent, or Firm* — Kowert, Hood, Munyon, Rankin & Goetzel, P.C.

(57) ABSTRACT

A memory controller may include a dynamic arbitration scheme to dynamically vary arbitration factors of two or more traffic classes based on dynamic latency tolerance, requested and available bandwidths on an interconnect from source agents to memory controllers, and other dynamic and static factors.

22 Claims, 7 Drawing Sheets

(56) References Cited

U.S. PATENT DOCUMENTS

| | | | |
|---|---|---|---|
| 2014/0201471 A1* | 7/2014 | Cutter | G06F 13/1663 |
| | | | 711/151 |
| 2016/0373362 A1* | 12/2016 | Cheng | H04L 47/24 |
| 2020/0057579 A1* | 2/2020 | Mathews | G06F 3/0673 |
| 2020/0057737 A1* | 2/2020 | Chidambaram Nachiappan ......... | |
| | | | G06F 13/4031 |

* cited by examiner

| Static Cfg |
|---|
| RT Bandwidth Fraction Min |
| RT Bandwidth Fraction Max |
| RT Margin |
| Packing Inefficiency |
| RT Catchup |
| Bulk and LLT weights |
| Min Multiplier |
| Low LTR |
| High LTR |

40

| Dynamic Cfg |
|---|
| RT Weights |
| Fabric Bandwidth |
| RT Bandwidth Multiplier |
| RT Bandwidth Fraction |

BANDWIDTH-AWARE FABRIC TRAFFIC SHAPING

This application claims benefit of priority to U.S. Provisional Patent Application Ser. No. 63/328,338, filed on Apr. 7, 2022. The above application is incorporated herein by reference in its entirety. To the extent that anything in the incorporated material conflicts with the material expressly set forth herein, the expressly-set-forth material controls.

BACKGROUND

Technical Field

Embodiments described herein are related to managing different classes of memory traffic in an integrated circuit such as a system on a chip (SOC).

Description of the Related Art

Various computer systems include a variety of agents that access memory during use. The agents can generate traffic of various types, or classes. For example, some agents generate real time traffic and other agents generate non-real time traffic. The real time traffic type is a type of traffic corresponding to data that is consumed by the agent based on the passage of actual time, and if the data is not available to the agent at the required time, then incorrect operation can occur. For example, multimedia data such as video data can be real time data. The data is displayed at a certain frame rate (e.g., a number of frames per second). If the data describing a frame is not available at the time the frame is displayed, then some video data is lost and can create visual artifacts on the display that can be detected by a user. On the other hand, non-real time data can experience arbitrary latency without experiencing incorrect operation. Performance can be affected, but typically not correctness. Balancing the bandwidth provided for various traffic types is an important aspect of the operation of the system.

BRIEF DESCRIPTION OF THE DRAWINGS

The following detailed description refers to the accompanying drawings, which are now briefly described.

FIG. 2 is a pair of tables illustrating example static and dynamic configuration data for one embodiment.

Figure 1:
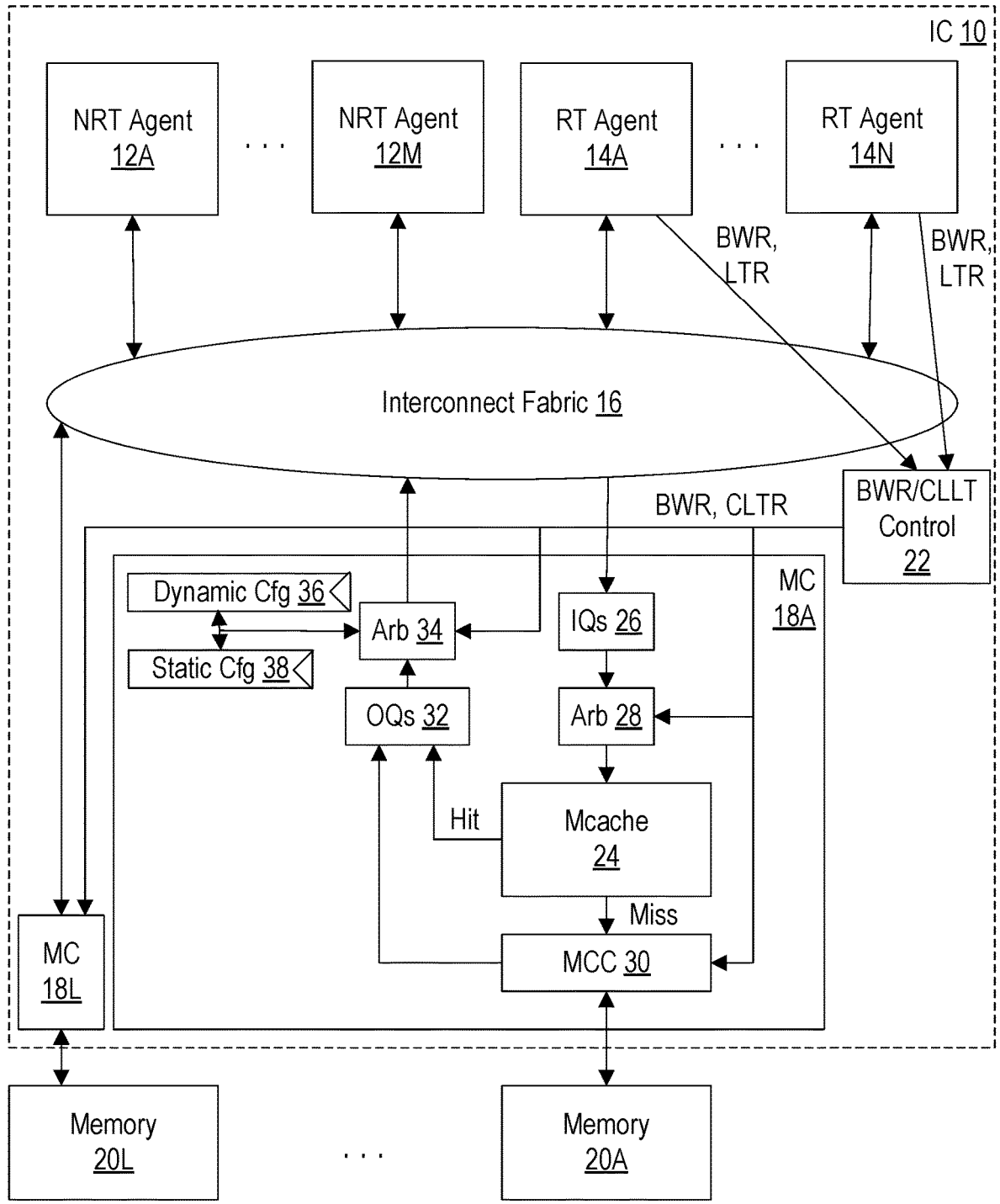
FIG. 1 is a block diagram of one embodiment of an integrated circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a block diagram of one embodiment of an integrated circuit (IC) 10 is shown. In an embodiment, the IC 10 may be a system on a chip (SOC), although other embodiments may implement any other type of IC. In the illustrated embodiment, the IC 10 includes one or more non-real time (NRT) agent circuits 12A-12M and one or more real time (RT) agent circuits 14A-14N. Any number of NRT agent circuits 12A-12M and RT agent circuits 14A-14N may be included, and the number of NRT agent circuits 12A-12M may differ from the number of RT agent circuits 14A-14N. The agent circuits 12A-12M and 14A-14N may be more succinctly referred to herein as "agents." The agents 12A-12M and 14A-14N are coupled to an interconnect fabric 16, to which one or more memory controllers 18A-18L are also coupled. The memory controllers 18A-18L are coupled to one or more memory devices 20A-20L, which may be external to the IC 10. A given memory controller 18A-18L may be coupled to one memory device 20A-20L, or multiple memory devices 20A-20L, in various embodiments. The IC 10 also includes a bandwidth request (BWR)/closed loop latency tolerance (CLLT) control circuit 22 coupled to the RT agents 14A-14N and the memory controllers 18A-18L.

The interconnect fabric 16 may be any communication interconnect and protocol for communicating among the components of the IC 10. The fabric 16 may be bus-based, including shared bus configurations, cross bar configurations, and hierarchical buses with bridges. The fabric 10 may also be packet-based, and may be hierarchical with bridges, cross bar, point-to-point, or other interconnects. The fabric 16 may generally support communication from the agents 12A-12M and 14A-14N to the memory controllers 18A-18L ("upstream") such as read and write requests to read and write data from/to the memory devices 20A-20L. The fabric may also generally support communication from the memory controllers 18A-18L to the agents 12A-12M and 14A-14M ("downstream") such as read responses with data and write responses indicating completion of non-posted writes. A given memory request and its response, if any, is referred to as a memory transaction. In embodiments that support coherency, the upstream and downstream communications for a given memory transaction may also include various communications supporting coherency. There may also be communications to program various configuration registers in the memory controllers 18A-18L, which may be memory-mapped or programmed input/output communications.

In an embodiment, there may be separate virtual channels on the fabric 16 for various traffic types. Each traffic type may have at least one virtual channel. For example, the RT agents 14A-14N may have an RT virtual channel that carries the RT traffic. In an embodiment, a second RT traffic type referred to as guaranteed RT (GRT) is supported and a separate GRT virtual channel may be provided to carry the GRT traffic. The NRT agents 12A-12M may have one or more NRT virtual channels as well. For example, NRT traffic may include low latency traffic (LLT) and bulk traffic. LLT may be given higher priority than bulk in the memory controller to attempt to provide lower latency for LLT traffic than for bulk traffic. LLT traffic may be carried in an LLT virtual channel and bulk traffic may be carried on a bulk virtual channel.

The fabric 16 is configured to independently route traffic on separate VCs to the memory controllers 18A-18L. That is, traffic on one VC does not block the progress of traffic on another VC. In an embodiment, separate resources (e.g., buffers) may be allocated to each VC at each network circuit in the fabric 16, and thus progress in a VC may always be possible even if another VC is blocked for lack of resources. Because the VCs are independent, RT traffic may arrive at the destination memory controller 18A-18L unimpeded by other traffic and thus RT latency is not affected by the amount of NRT traffic transmitted in the system. In an embodiment, the upstream flow of traffic may be essentially unconstrained. Balancing the memory transactions that access the memory devices 20A-20L may be used by the memory controllers 18A-18L to provide a requested amount of bandwidth for RT traffic at the highest priority, and then allow NRT traffic to consume the remainder of the bandwidth. By limiting the RT traffic to the requested amount of bandwidth, RT traffic may be provided at low latency without starving the NRT traffic. If there is additional bandwidth beyond the requested RT bandwidth that is unconsumed by NRT traffic, that unconsumed bandwidth may be allocated to the RT traffic as well.

While the above approach balances traffic to the memory devices 20A-20L, in some embodiments the memory controllers 18A-18L employ a memory cache (e.g., the MCache 24 shown in the memory controller 18A in FIG. 1). Memory transactions that hit in the memory cache (whether RT or NRT) are not affected by the balancing of transactions sent to the memory devices 20A-20L. If RT transactions do not frequently hit in the MCache 24, then the balancing still provides RT with its requested bandwidth because of the higher priority given to RT traffic until the requested bandwidth is satisfied. However, if RT transactions hit frequently in the MCache 24, the larger number of RT responses ready to send back to the RT agents 14A-14N may consume significantly more bandwidth on the downstream path than the RT traffic is intended to consume at high priority. Additionally, many read transactions including more than one beat of data transfer on the downstream path for one read request on the upstream path. Accordingly, the downstream path may be become a "choke point" for completion of memory transactions. The GRT traffic type may be allocated reserved space in the MCache 24 and thus normally will hit in the MCache 24, which may further worsen the imbalance caused by RT memory cache hits.

To improve the overall system bandwidth balance, the memory controllers 18A-18L may be configured to arbitrate bandwidth for memory transactions using a dynamic weighted arbitration scheme. The relative weight of RT traffic compared to NRT traffic may be increased when additional RT transactions are to be completed to satisfy the requested RT bandwidth (BWR), and may be decreased at other times. The arbitration scheme may effectively shape the traffic among the traffic types to balance the RT requirements with forward progress of NRT transactions.

In one embodiment, the RT agents 14A-14N may be configured to generate requested bandwidth values (BWR). The BWR may be generated by a given RT agent 14A-14N to ensure that, if the requested bandwidth is satisfied over a period of time, the given RT agent 14A-14N will have functionally-correct behavior. That is, the given RT agent may request bandwidth that will result in at least the required amount of data transfer to the given RT agent to provide correct operation. The given RT agent may generate the BWR based on an accurate determination of bandwidth, or may conservatively estimate the bandwidth if accurate determination is not possible (e.g., the conservative estimate may be more than the required bandwidth, but not less). For example, a display agent may be displaying frames at a specified frame rate, which determines the amount of time by which the frame data needs to be supplied. The size of the frame may be known from the resolution and the amount of data that represents each pixel. Accordingly, the BWR may be at least a full frame of data within the amount of time that the frame is displayed.

The RT agents 14A-14N may generate requests that exceed the BWR within a subinterval of the time frame over which BWR is to be satisfied. During such a subinterval, the RT agents 14A-14N may receive a greater share of the available bandwidth than might be expected based on the BWR. To mitigate this effect, the memory controllers may be configured to dynamically generate weights for RT and NRT requests that take into account the BWR and the available bandwidth on the interconnect fabric 16. Thus, the NRT agents may be permitted to use appropriate amounts of bandwidth even in the presence of "bursty" RT requests.

The BWR/CLLT control circuit 22 may receive the BWR from the RT agents 14A-14N, and may be configured to generate a combined BWR for the memory controllers 18A-18L. For example, the combined BWR output to the memory controllers 18A-18L may be the sum of the BWR from the RT agents 14A-14N. The memory controllers 18-18L may employ the combined BWR and the available bandwidth to more accurately balance the bandwidth provided to the RT and NRT traffic in the system.

In one embodiment, the RT agents 14A-14N may be configured to generate an estimated latency tolerance value (LTR in FIG. 1) that may specify an estimated amount of data latency the respective RT agents 14A-14N are capable of experiencing without underrunning their data. The LTR may be based on an amount of data buffered by the respective RT agent and a rate at which the respective RT agent consumes the data, for example. In an embodiment, the respective RT agent may generate the LTR to guarantee that data will not underrun. That is, to the extent that the respective RT agent estimates the LTR, the respective RT agent may estimate conservatively so that if the estimate is inaccurate, the estimate is lower than the actual latency tolerance. In other embodiments, the respective RT agent may be capable of tolerating an occasional data underrun. In such embodiments, the respective RT agent may be configured to generate the LTR based on a threshold likelihood of underrun, for example. Alternatively, the respective RT agent may generate the LTR value without any guardband to avoid underrun, as opposed to a more conservative mechanism that may be used to ensure that underrun does not occur.

The RT agents 14A-14N may be configured to transmit the LTRs to the BWR/CLLT control circuit 22, which may be configured to generate a current latency tolerance (CLTR) based on the LTRs. The CLTR may be a measure of the overall latency tolerance of the RT agents 14A-14N as a whole. For example, the CLTR may be a minimum of the LTRs. Alternatively, the CLTR may be less than a minimum of the LTRs by a guardband amount. The guardband amount may be static, or may be generated based on the relative value of the LTRs as a whole (e.g., if several LTRs are near the minimum LTR, the guardband may be larger than if fewer LTRs are near the minimum LTR).

The arbitration scheme implemented by the memory controllers 18A-18L may be based on the BWR, the available bandwidth, and the CLTR. Weights may be based on the BWR and the available bandwidth, and may be scaled based on the CLTR. For example, if the CLTR is below a threshold, one or more of the RT agents maybe reaching a critically low level of read data (or critically high level of write data). In such cases, the relative weights for RT traffic compared to NRT traffic may be increased. If the CLTR is above another threshold the RT agents may have sufficient data reserves and the relative weights for the RT traffic compared to the NRT traffic may be decreased. Thus, an arbitration scheme having dynamic weights based on requested RT bandwidth (BWR), the available bandwidth supported by the fabric 16, and the CLTR may be provided.

In an embodiment, the NRT weights may be static, and one or more RT weights may be dynamically varied to implement the dynamic weighted arbitration scheme. Such an implementation my simplify the logic circuitry involved in generating the weights. Other embodiments may dynamically vary both RT and NRT weights based on the above factors, as desired.

The memory controller 18A is shown in greater detail in FIG. 1, and other memory controllers may be similar. In the illustrated embodiment, the memory controller 18A may include one or more input queue or buffer circuits (IQs) 26, a request arbiter circuit 28, the MCache 24, a memory channel controller circuit (MCC) 30, one or more output queue or buffer circuits (OQs) 32, and a response arbiter circuit 34. The memory controller 18A may further include dynamic configuration registers 36 and static configuration registers 38 to store dynamic and static configuration data for arbitration, as will be described in more detail below. The IQs 26 are coupled to the fabric 16 and are configured to store memory transactions awaiting selection to probe the MCache 24 and/or to access the memory device 20A. There may be multiple IQs 26 to store traffic from different sources. For example, there may be central processing unit (CPU) queues to store memory transactions issued by CPUs, which may be NRT agents. There may be graphics processing unit (GPU) queues to store memory transactions issued by GPUs, which may be NRT agents, RT agents, or both based on the internal source of various memory transactions. There may be system input queues to store memory transactions issued by various other agents in the system, such as peripherals. Peripherals may be a combination of NRT and RT agents 12A-12M and 14A-14N. The IQs 26 are coupled to the request arbiter circuit 28, which is coupled to the MCache 24 and is configured to receive the CLTR from the CLLT control circuit 22. The MCache 24 is coupled to the MCC 30, which is coupled to the memory device 20A. The MCC 30 and the MCache 24 are coupled to the OQs 32, which are coupled to the response arbiter circuit 34. There may be multiple OQs 32, e.g., to match the IQs 26. The response arbiter circuit 34 is coupled to the configuration registers 36 and 38.

In an embodiment, the response arbiter circuit 34 may be configured to implement the dynamic weighted arbitration scheme described herein. Thus, the response arbiter circuit 34 receives the CLTR and BWR from the BWR/CLLT control circuit 22, and is configured to generate the dynamic weights. The response arbiter circuit 34 is configured to arbitrate among RT and NRT transactions based on the dynamic weights. The dynamic weights, and other dynamically-generated or dynamically-updated values, may be stored in the dynamic configuration register 36. The static values used in the dynamic weight generation may be stored in the static register 38. The static values may be static in the sense that the hardware circuitry does not update them. They can be changed periodically by software, by updating the values, as desired.

Generally, the IQs receive the memory transactions from the interconnect fabric 16. The request arbiter circuit 28 may be configured to arbitrate among the memory transactions to issue transactions to the MCache 24 and MCC 30. The request arbiter circuit 28 may be configured to implement a weighted arbitration scheme based on static weights. Other embodiments may implement the dynamic weighted arbitration scheme at the request arbiter circuit 28 as well. The request arbiter circuit 28 may receive the BWR and/or CLTR from the BWR/CLLT control circuit 22 for use in the arbitration, in some embodiments.

The MCache 24 may receive memory transactions from the IQs 26 as selected by the request arbiter circuit 28, and may check the memory transactions for a hit in the MCache 24. If the memory transaction is a hit, the MCache 24 may transmit a response to the OQs 32 (e.g., a write response, after updating the cache line with the write data, for non-posted write transactions, or a read response with the read data, for a read transaction). If the memory transaction is a miss in the MCache 24, the memory transaction may proceed to the MCC 30. The MCC 30 may also have transaction queues (not shown), and may arbitrate among transactions while attempting to efficiently use bandwidth on the memory interface to the memory device 20A. The MCC 30 may arbitrate RT transactions with a high priority up to their requested bandwidth, and may provide NRT transactions with the remaining bandwidth and possibly providing additional RT bandwidth if the NRT transactions do not consume all of the remaining bandwidth. The MCC 30 may be configured to enqueue responses for memory transactions in the OQs 32 as well. The response arbiter circuit 34 may arbitrate among the memory transactions using the dynamic weighted arbitration scheme, as mentioned above, to transmit the responses to the source agents of the memory transactions.

The memory devices 20A-20L may be any sort of memory device, such as static random-access memory (RAM), dynamic RAM (DRAM), various forms of synchronous DRAM (SDRAM) such as double data rate (DDR) SDRAM, etc. The DDR SDRAM may be any generation of DRAM (DDR1, DDR2, DDR3, DDR4, DDR5, etc.) and/or the low power versions of the DDR SDRAMs (LP1, LP2, LP3, LP4, LP5, etc.).

In accordance with this description, an embodiment of an integrated circuit (e.g., an SOC) may comprise one or more first agent circuits (e.g., RT agents). The first agent circuits may be configured to generate memory transactions having a first type. The first agent circuits may also be configured to generate respective latency tolerance values that specify an estimated amount of data latency the respective first agent circuits are capable of experiencing without underrunning data. The first agent circuits may still further be configured to generate requested bandwidth values. The integrated circuit may comprise a control circuit, which may be coupled to the one or more first agent circuits and may be configured to generate a current latency tolerance based on the respective latency tolerances and a current requested bandwidth value based on the respective requested bandwidth values. The integrated circuit may comprise one or more second agent circuits (e.g., NRT agents) which may be configured to generate memory transactions having a second type. The integrated circuit may still further comprise one or more memory controllers configured to control one or more memory devices external to the integrated circuit. The integrated circuit may comprise an interconnect fabric coupled to the one or more first agent circuits and one or more second agent circuits, wherein the interconnect fabric is configured to provide up to a given bandwidth for memory transactions. The one or more memory controllers may comprise respective arbitration circuits configured to arbitrate among the memory transactions of the first type and the memory transactions of the second type. The respective arbitration circuit may employ a weighted arbitration scheme in which a given traffic type has a given weight that affects a result of the weighted arbitration scheme. The respective arbitration circuit of a given memory controller of the one or more memory controllers may configured to dynamically generate at least a first weight corresponding to the first traffic type based on the given bandwidth, the current requested bandwidth, and the current latency tolerance.

It is noted that, while the BWR/CLLT control circuit 22 is illustrated in the embodiment of FIG. 1, the circuitry implementing the BWR/CLLT control circuit 22 may be distributed throughout the interconnect fabric 16. For example, at each point in the interconnect fabric 16 at which requests from two or more RT agents 14A-14N are combined, the corresponding BWR and LTR may be combined as well, until the resulting CLTR and current BWR arrive at the memory controllers 18A-18L.

Turning now to FIG. 2, a pair of tables 40 and 42 are shown illustrating example static configuration for the static configuration register 38 and dynamic configuration for the dynamic configuration register 36, respectively, for an embodiment. Other embodiments may implement a subset of the configurations shown and/or additional configuration, a superset of the configuration and additional configuration, etc.

The static configuration (table 40) may include minimum and maximum fractions for the RT bandwidth. The fractions may be fractions of the total bandwidth available on the fabric 16 for the responses. The RT margin may be a programmable factor to account for occasional inefficiencies in the use of the bandwidth (e.g., bandwidth that isn't fully utilized due to responses not being ready to send or other delay in the memory controller 18A-18L).

Read responses that require more than one beat of data can include packed write responses: Since the read response does not require the command portion of the response after the first beat of read data, the command portion of subsequent beats of read data may be used to carry a write response. Not all write transactions require write responses, in some embodiments, but at least a subset include write responses (e.g., non-posted write transactions). To more fully utilize bandwidth, the memory controllers 18A-18L may be configured to attempt write response packing were possible. However, there may be inefficiencies in the packing as well (e.g., if no write response is available when the read beats are being transmitted, or some other delay prevents the write response from being packed). The packing inefficiency may be a programmable factor to account for such inefficiencies. That is, the RT weight may be a read RT weight in this case, and the packing inefficiency may be used to modify (e.g., increase) the read RT weight. The programming of the RT margin and the packing inefficiency may be determined, e.g., by studying statistics of gathered from operation of the IC 10 in a system.

The RT catchup may be another factor incorporated into the RT dynamic weight calculation. When CLTR is lower than a given threshold, the RT catchup factor may be incorporated into the weight calculation to further increase the relative RT weight compared to NRT weights.

As mentioned above, the NRT weights (e.g., bulk and LLT weights) may be held constant (e.g., static) while the RT weights are dynamically generated. Accordingly, the bulk and LLT weights may be statically configured in this embodiment.

A minimum multiplier (min multiplier) may be a base level to multiply by the RT bandwidth fraction to obtain the RT weight. The minimum multiplier may apply when the CLTR is above a second threshold. The low LTR may be the low CLTR threshold. If the CLTR is below the low LTR threshold, the RT catchup value may be fully included in the multiplier (e.g., the RT dynamic weight is calculated as its larger fraction of the overall bandwidth). The high LTR may be the other CLTR threshold. If the CLTR is above the high LTR threshold, the minimum multiplier may be used to generate the RT weight with no contribution from the RT catchup.

The dynamic configuration (table 42) may include the RT weight or weights, dynamically generated by the response arbiter circuit 34 and used by the response arbiter circuit 34. An RT bandwidth multiplier may be dynamically generated as part of generating the RT weights, and the RT bandwidth fraction may also be dynamically generated as part of generating the RT weights. Additional details are provided below.

Figure 3:
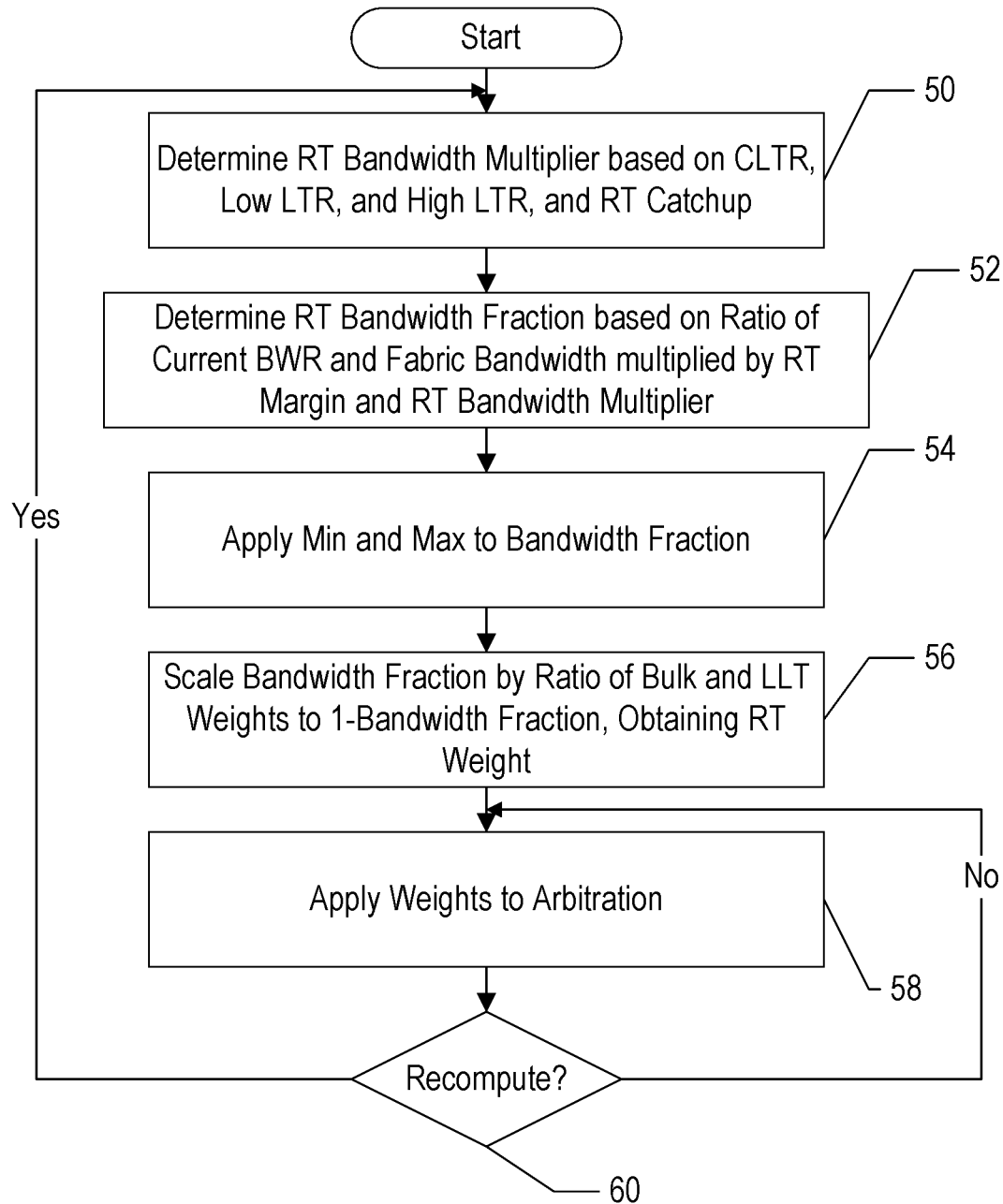
FIG. 3 is a flowchart illustrating operation of one embodiment of an arbiter circuit.
Figure 4:
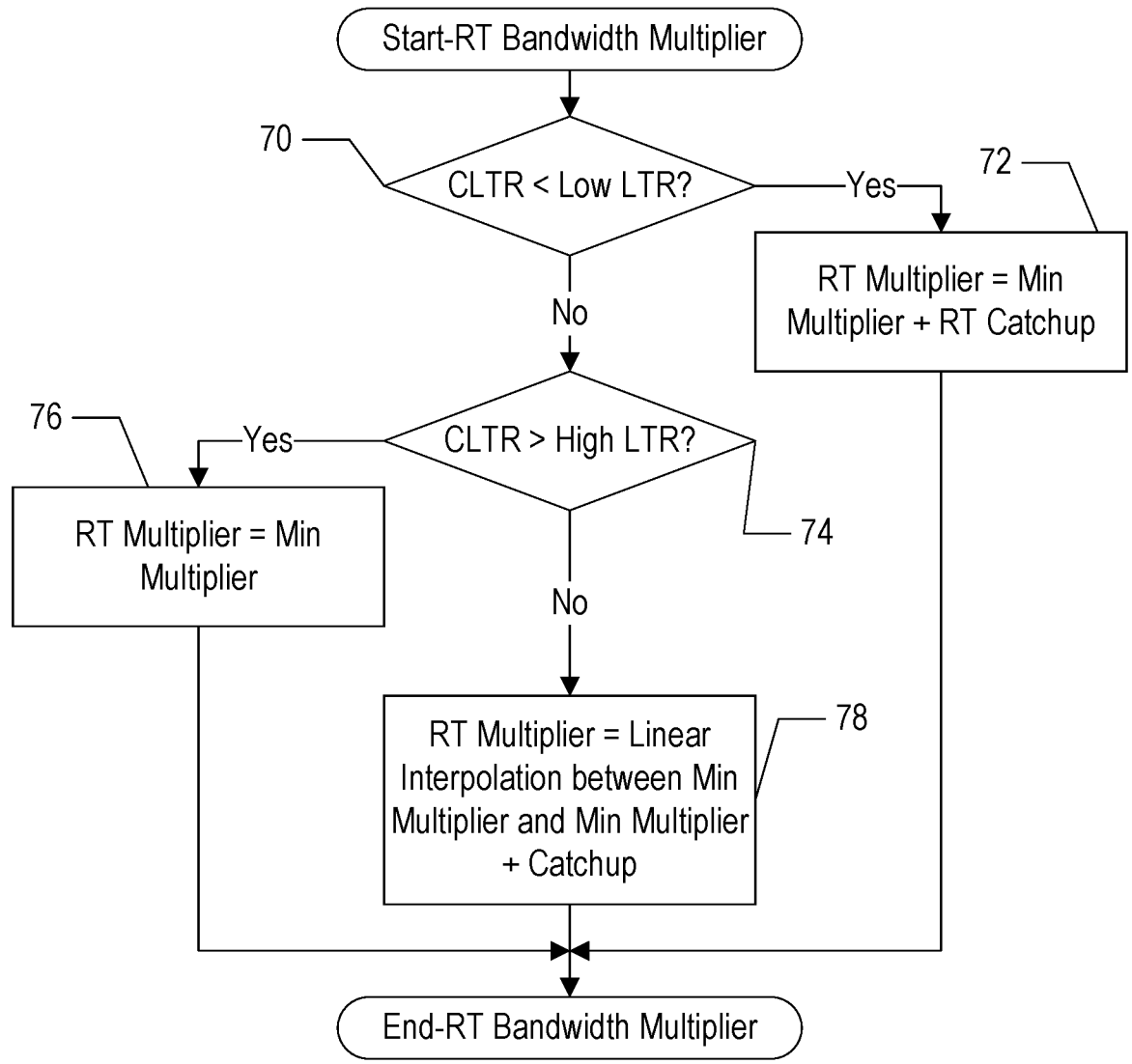
FIG. 4 is a flowchart illustrating a portion of FIG. 3 in greater detail.

FIGS. 3 and 4 are flowcharts illustrating operation of one embodiment of the response arbiter circuit 34. While the blocks are shown in a particular order for ease of understanding, other orders may be used. Blocks may be performed in parallel in combinatorial logic circuits in the response arbiter circuit 34. Blocks, combinations of blocks, and/or the flowchart as a whole may be pipelined over multiple clock cycles. The response arbiter circuit 34 may be configured to perform the operations illustrated in FIGS. 3 and 4.

The response arbiter circuit 34 may be configured to determine the RT bandwidth multiplier based on a comparison of the current latency tolerance to one or more thresholds (e.g., the low LTR and the high LTR). The response arbiter circuit 34 may further be configured to determine the RT bandwidth multiplier based on the RT catchup value (block 50). The RT weight will be based on the bandwidth multiplier in addition to the available fabric bandwidth and the current BWR. For example, FIG. 4 is a flowchart illustrating block 50 in greater detail. In FIG. 4, if the CLTR is less than the low LTR (decision block 70, "yes" leg), the response arbiter circuit 34 may generate the RT bandwidth multiplier equal to a first value (e.g., the sum of the minimum multiplier and the RT catchup) (block 72). On the other hand, if the CLTR is greater than the high LTR (decision block 70, "no" leg and decision block 74, "yes" leg), the response arbiter circuit 34 may generate the RT bandwidth multiplier equal to a second value less than the first value (e.g., the min multiplier value) (block 76). If the CLTR is between the low LTR and the high LTR (decision blocks 70 and 74, "no" legs), the response arbiter circuit 34 may generate the bandwidth multiplier as a linear interpolation between the first and second values (block 78).

The response arbitration circuit 34 may generate the RT bandwidth fraction based on a ratio of the current BWR and the fabric bandwidth. The RT bandwidth fraction may be used to generate the RT weight, and thus the RT weight is based on the ratio as well. In an embodiment, the response arbitration circuit 34 may generate the RT bandwidth fraction based on multiplying the ratio by the RT bandwidth multiplier. In an embodiment, the RT bandwidth fraction, and thus the RT weight, is further based the RT margin (e.g., the RT margin may be multiplied by the ratio and the RT bandwidth multiplier) (block 52). As discussed above, the RT margin may account for potential inefficiency in bandwidth consumption by the memory controller.

The response arbitration circuit 34 may apply an upper and lower bound for the RT bandwidth fraction (block 54). The upper bound may be the RT bandwidth fraction maximum, and the lower bound may be the RT bandwidth fraction minimum, both programmed in the static configuration register 36 as discussed above. Accordingly, the response arbitration circuit 34 may be configured to generate the RT bandwidth fraction, and thus the RT weight, based on the upper and lower bounds.

Because the non-RT weights (e.g., the bulk weight and the LLT weight, programmed in the static configuration register 36) are static, the generation of the RT weight in this fashion may not lead to the non-RT traffic receiving the remaining bandwidth (e.g., 1-RT bandwidth fraction). To account for the static nature of the non-RT weights, the response arbiter circuit 34 may be configured to generate RT weight by scaling the RT bandwidth fraction by a scale factor (block 56). The scale factor may be the ratio of: (a) the sum of the non-RT weights (e.g., a second weight) to (b) 1-RT bandwidth fraction (block 56). In an embodiment, item (b) may further have a lower bound of a minimum fraction for NRT transactions (e.g., item (b) may be the maximum of the lower bound and the value determined by 1-RT bandwidth fraction). In an embodiment, the packing inefficiency noted above may also be included in item (b) of the ratio (e.g., item (b) may be 1-RT bandwidth fraction-packing inefficiency). As mentioned above, the packing inefficiency factor may account for cases in which a given write response is not able to be concurrently transmitted with a beat of read data.

The response arbiter circuit 34 may be configured to apply the weights in the weighted arbitration scheme to schedule RT and NRT responses to complete the RT and NRT memory transactions (block 58). In an embodiment, the weights may be used for a period of time before recomputing the dynamic weights (decision block 60, "no" leg). When the time period expires, the dynamic weights may be recomputed (decision block 60, "yes" leg). Alternatively, the dynamic weights may be continuously recomputed. The time period may be static, or may be based on when a change in one or more of the dynamic input values is detected (e.g., more than a threshold level of change or any amount of change, in various embodiments). There may be a short delay (e.g., one or a few clock cycles) between a detected change in a dynamic input value and a corresponding change in the dynamic weights to allow time to computer the modified dynamic weight, in an embodiment.

The above description has referred to generating an RT weight. In embodiments that implement the GRT virtual channel and transactions, and dynamic GRT weight may also be generated. The GRT weight may be based on separate set of programmable factors similar to the RT weight, and may have a separate GRT bandwidth requested. Thus, the GRT weight and the RT weight may be independently generated, but in a similar fashion. Additionally, there may be separate weights for read and write transactions as mentioned previously.

While the above description refers to generating weights and using the weights in a weighted arbitration scheme, other embodiments may use the inverse of weights (e.g., grant increments, or grant intervals). The grant increments/intervals may specify how frequently, on average, a given traffic type should win arbitration and be selected to transmit a response on the interconnect fabric. For example, a grant increment of 3 indicates that if the corresponding traffic type wins an arbitration, three more arbitrations should occur before the corresponding traffic type wins again. On the other hand, a grant increment of 5 indicates that if the corresponding traffic type wins an arbitration, five more arbitrations should occur before the corresponding traffic type wins again. If no other traffic types are available for arbitration, the corresponding traffic type may win the arbitration even if its grant increment has not expired. Thus, a numerically larger grant increment/interval may correspond to a less frequent arbitration win for the corresponding traffic type. On the other hand, a numerically larger weight may indicate a more frequent arbitration win for the corresponding traffic type than a numerically lower weight. The term "arbitration factor" is used generally to refer to any value that is used by an arbitration circuit to determine how frequently different arbitrating sources (e.g., traffic types in this case) are to win the arbitration. Both weights and arbitration factors may be examples of arbitration factors. Increasing an arbitration factor refers to making the corresponding arbitration source win the arbitration more frequently (e.g., increasing weight or decreasing grant interval), and decreasing the arbitration factor refers to making the corresponding arbitration source win the arbitration less frequently (e.g., decreasing weight or increasing grant interval).

Figure 5:
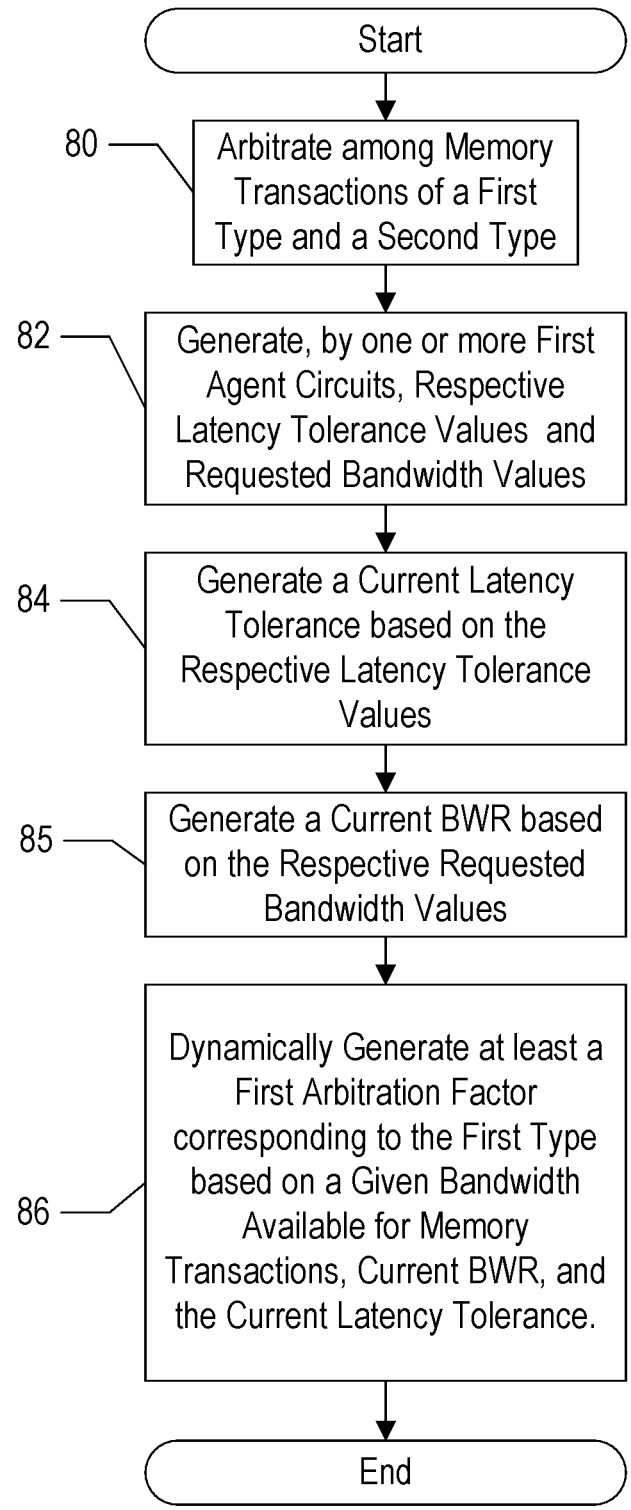
FIG. 5 is a flowchart illustrating one embodiment of a method.

Turning now to FIG. 5, a flowchart is shown illustrating one embodiment of a method for dynamically varying arbitrations factors. While the blocks are shown in a particular order for ease of understanding, other orders may be used. Blocks may be performed in parallel in combinatorial logic circuits in the IC 10. Blocks, combinations of blocks, and/or the flowchart as a whole may be pipelined over multiple clock cycles. The IC 10 may be configured to perform the operations illustrated in FIG. 5.

In an embodiment, a method may include arbitrating among memory transactions of a first type and a second type (block 80). Memory transactions of the first type may be generated by one or more first agent circuits (e.g., RT agent circuits 14A-14N) and memory transactions of the second type may be generated by one or more second agent circuits (e.g., NRT agent circuits 12A-12M). The arbitration may be based on a first arbitration factor corresponding to the first type and a second arbitration factor corresponding to the second type. The method may further include generating, by the one or more first agent circuits, respective latency tolerance values that specify an estimated amount of data latency that respective first agent circuits are capable of experiencing without underrunning data and requested bandwidth values (block 82). The method may further comprise generating a current latency tolerance based on the respective latency tolerance values (block 84). The method may include generating a current BWR based on the respective requested bandwidth values (block 85). The method may include dynamically generating at least the first arbitration factor corresponding to the first type based on a given bandwidth available for memory transactions (e.g., bandwidth on an interconnect between the one or more first agent circuits, the one or more second agent circuits, and one or more memory controllers), the current BWR, and the current latency tolerance (block 86). The method may further comprise generating a bandwidth multiplier for the first type based on a comparison of the current latency tolerance to one or more thresholds, wherein the first arbitration factor is further based on the bandwidth multiplier.

Computer System

Figure 6:
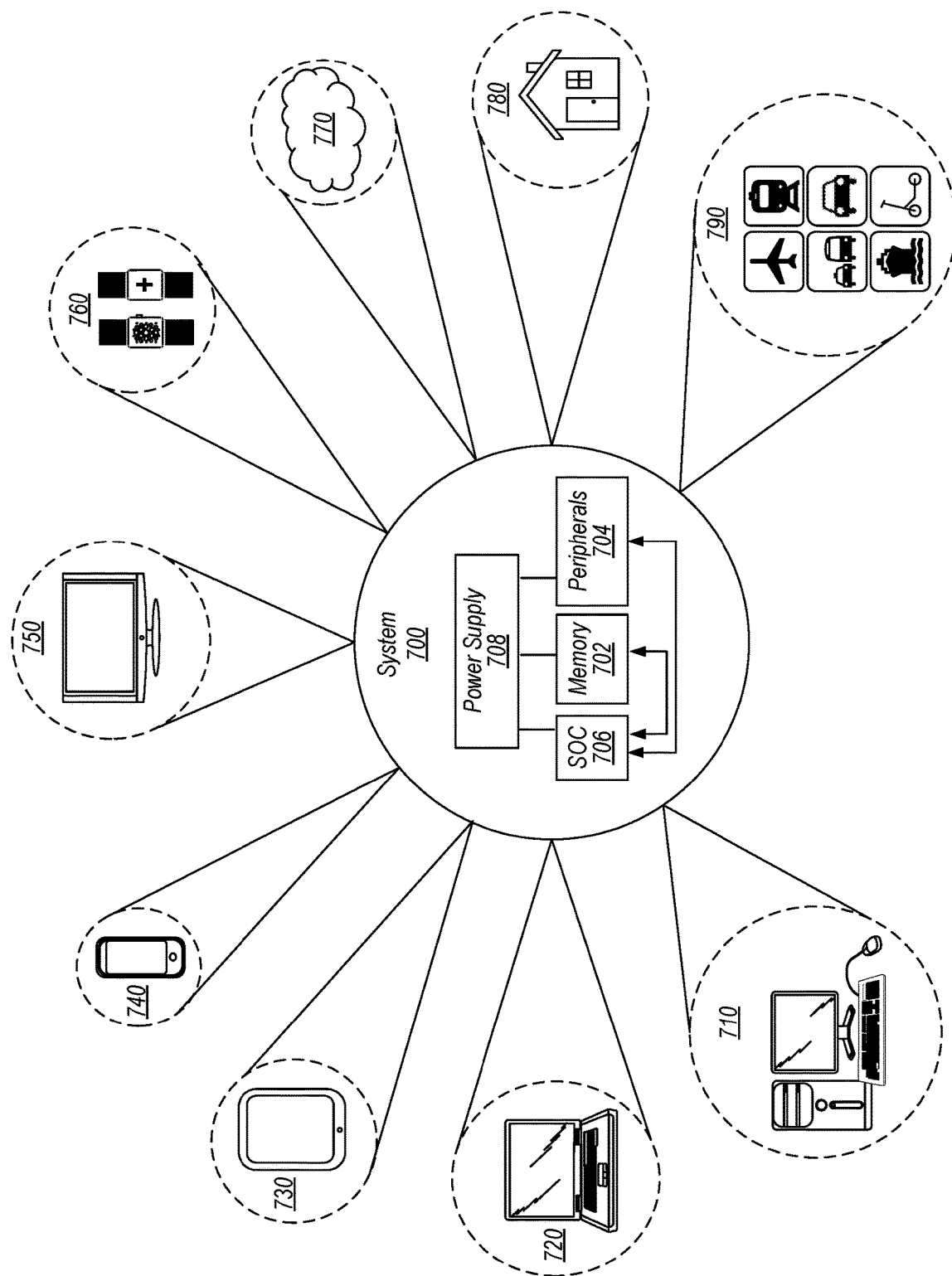
FIG. 6 is a block diagram of one embodiment of a system including an embodiment of the IC shown in FIG. 1.

Turning next to FIG. 6, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC may be included (and more than one memory 702 may be included as well). The memory 702 may include the memory devices 20A-20L illustrated in FIG. 1, in an embodiment. The SOC 706 may be an instance of the IC 10 illustrated in FIG. 1, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 700 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 6 are illustrative only and are not intended to be limiting. Other devices are possible and are contemplated.

Computer Readable Storage Medium

Figure 7:
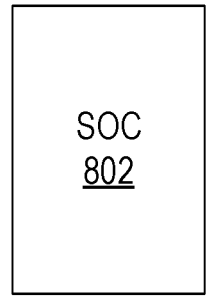
FIG. 7 is a block diagram of one embodiment of a computer accessible storage medium.

Turning now to FIG. 7, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 7 may store a database 804 representative of the SOC 706 (e.g., the IC 10). Generally, the database 804 may be a database which can be read by a program and used, directly or indirectly, to fabricate the hardware comprising the SOC 706. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 300. The netlist may then be placed and routed to produce a data set describing geometric shapes to be applied to masks. The masks may then be used in various semiconductor fabrication steps to produce a semiconductor circuit or circuits corresponding to the SOC 300. Alternatively, the database 804 on the computer accessible storage medium 800 may be the netlist (with or without the synthesis library) or the data set, as desired.

While the computer accessible storage medium 800 stores a representation of the SOC 300, other embodiments may carry a representation of any portion of the SOC 100, as desired, including any subset of the components shown in FIG. 1. Furthermore, the database 804 may represent the processors 10A-10N, the coprocessor 12, or both as shown in FIG. 1, and may further represent the LLC 14 and/or the memory controller 16. The database 804 may represent any portion of the above.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of to improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
one or more first agent circuits configured to generate memory transactions having a first type, wherein the one or more first agent circuits are configured to generate respective latency tolerance values that specify an estimated amount of data latency that respective first agent circuits are capable of experiencing without underrunning data and further configured to generate a requested bandwidth value;
wherein a given first agent circuit of the one or more first agent circuits is configured to generate the respective latency tolerance value based on a threshold likelihood of underrunning data;
a control circuit coupled to the one or more first agent circuits and configured to generate a current latency tolerance based on the respective latency tolerance values and a current requested bandwidth value based on the respective requested bandwidth values;
one or more second agent circuits configured to generate memory transactions having a second type;
one or more memory controllers configured to control one or more memory devices external to the integrated circuit; and
an interconnect fabric coupled to the one or more first agent circuits and the one or more second agent circuits, wherein the interconnect fabric is configured to provide up to a given bandwidth for memory transactions, wherein:
the one or more memory controllers comprise respective arbitration circuits configured to arbitrate among the memory transactions of the first type and the memory transactions of the second type;
the respective arbitration circuit employs an arbitration scheme in which a given traffic type has a given arbitration factor that affects a result of the arbitration scheme; and
the respective arbitration circuit of a given memory controller of the one or more memory controllers is configured to dynamically generate at least a first arbitration factor corresponding to the given traffic type based on the given bandwidth, the current requested bandwidth value, and the current latency tolerance.

2. The integrated circuit as recited in claim 1 wherein the respective arbitration circuit is configured to generate a bandwidth multiplier for the first type based on a comparison of the current latency tolerance to one or more thresholds, wherein the first arbitration factor is further based on the bandwidth multiplier.

3. The integrated circuit as recited in claim 2 wherein the respective arbitration circuit is configured to generate the bandwidth multiplier equal to a first value when the current latency tolerance is less than a first threshold of the one or more thresholds, and wherein the respective arbitration circuit is configured to generate the bandwidth multiplier equal to a second value less than the first value when the current latency tolerance is greater than a second threshold of the one or more thresholds, wherein the second value is less than the first value.

4. The integrated circuit as recited in claim 3 wherein the respective arbitration circuit is configured to generate the bandwidth multiplier as a linear interpolation between the first and second values when the current latency tolerance is between the first and second thresholds.

5. The integrated circuit as recited in claim 2 wherein the respective arbitration circuit is configured to generate the first arbitration factor based on a ratio of the given bandwidth and the current requested bandwidth value.

6. The integrated circuit as recited in claim 5 wherein the respective arbitration circuit is configured to generate the first arbitration factor further based on multiplying the ratio by the bandwidth multiplier.

7. The integrated circuit as recited in claim 1 wherein the respective arbitration circuit is configured to generate the first arbitration factor based on an upper bound and a lower bound for the first arbitration factor.

8. The integrated circuit as recited in claim 1 wherein at least a second arbitration factor corresponding to the second type is not dynamically modified by the respective arbitration circuit, and wherein the respective arbitration circuit is configured to generate a scale factor as a ratio of (a) the second arbitration factor and (b) one minus a ratio of the given bandwidth and the current requested bandwidth value, and wherein the respective arbitration circuit is configured to generate the first arbitration factor based on the scale factor.

9. The integrated circuit as recited in claim 1 where the respective arbitration circuit is programmable with a margin value that accounts for potential inefficiency in bandwidth consumption by the one or more memory controllers.

10. The integrated circuit as recited in claim 1 wherein the first arbitration factor is associated with read transactions, and wherein at least a subset of write transactions are terminated by write responses, and wherein a given write response is packed with a beat of read data for a given read transaction when the given write response is transmitted as a command concurrent with the beat of read data, and wherein the respective memory controller is programmable with a packing inefficiency factor that accounts for cases in which the given write response is not able to be concurrently transmitted with the beat of read data, and wherein the first arbitration factor is further based on the packing inefficiency factor.

11. The integrated circuit as recited in claim 1 wherein the given first agent circuit is further configured to generate the estimated amount of latency tolerance using a guardband to decrease a likelihood of underrunning data.

12. A system comprising:
one or more memory devices; and
an integrated circuit comprising:
one or more first agent circuits configured to generate memory transactions having a first type, wherein the one or more first agent circuits are configured to generate respective latency tolerance values that specify an estimated amount of data latency that respective first agent circuits are capable of experiencing without underrunning data and further configured to generate a requested bandwidth value;
a control circuit coupled to the one or more first agent circuits and configured to generate a current latency tolerance based on the respective latency tolerance values and a current requested bandwidth value based on the respective requested bandwidth values;
one or more second agent circuits configured to generate memory transactions having a second type;
one or more memory controllers configured to control the one or more memory devices; and
an interconnect fabric coupled to the one or more first agent circuits and the one or more second agent circuits, wherein the interconnect fabric is configured to provide up to a given bandwidth for memory transactions, wherein:
the one or more memory controllers comprise respective arbitration circuits configured to arbitrate among the memory transactions of the first type and the memory transactions of the second type;
the respective arbitration circuit employs an arbitration scheme in which a given traffic type has a given arbitration factor that affects a result of the arbitration scheme; and
the respective arbitration circuit of a given memory controller of the one or more memory controllers is configured to dynamically generate, between an upper bound and a lower bound, at least a first arbitration factor corresponding to the given traffic type based on the given bandwidth, the current requested bandwidth value, and the current latency tolerance.

13. The system as recited in claim 12 wherein the respective arbitration circuit is configured to generate a bandwidth multiplier for the first type based on a comparison of the current latency tolerance to one or more thresholds, wherein the first arbitration factor is further based on the bandwidth multiplier.

14. The system as recited in claim 13 wherein the respective arbitration circuit is configured to generate the bandwidth multiplier equal to a first value when the current latency tolerance is less than a first threshold of the one or more thresholds, and wherein the respective arbitration circuit is configured to generate the bandwidth multiplier equal to a second value less than the first value when the current latency tolerance is greater than a second threshold of the one or more thresholds, wherein the second value is less than the first value.

15. The system as recited in claim 14 wherein the respective arbitration circuit is configured to generate the bandwidth multiplier as a linear interpolation between the first and second values when the current latency tolerance is between the first and second thresholds.

16. The system as recited in claim 13 wherein the respective arbitration circuit is configured to generate the first arbitration factor based on a ratio of the given bandwidth and the current requested bandwidth value.

17. The system as recited in claim 16 wherein the respective arbitration circuit is configured to generate the first arbitration factor further based on multiplying the ratio by the bandwidth multiplier.

18. A method comprising:
arbitrating among memory transactions of a first type and a second type, wherein memory transactions of the first type are generated by one or more first agent circuits and wherein memory transactions of the second type are generated by one or more second agent circuits, and wherein the arbitration is based on a first arbitration factor corresponding to the first type and a second arbitration factor corresponding to the second type;
generating, by the one or more first agent circuits, respective latency tolerance values that specify an estimated amount of data latency that respective first agent circuits are capable of experiencing without underrunning data, wherein at least one of the one or more first agent circuits generated the respective latency tolerance value based on a threshold likelihood of underrunning data;
generating, by the one or more first agent circuits, respective requested bandwidth values;
generating a current latency tolerance based on the respective latency tolerance values;
generating a current requested bandwidth value based on the respective requested bandwidth values; and
dynamically generating at least the first arbitration factor corresponding to the first type based on:
a given bandwidth available for memory transactions on an interconnect between the one or more first agent circuits, the one or more second agent circuits, and one or more memory controllers;
the current requested bandwidth value; and
the current latency tolerance.

19. The method as recited in claim 18 further comprising:
generating a bandwidth multiplier for the first type based on a comparison of the current latency tolerance to one or more thresholds, wherein the first arbitration factor is further based on the bandwidth multiplier.

20. The method as recited in claim 18 wherein dynamically generating the first arbitration factor includes generating the first arbitration factor based on an upper bound and a lower bound for the first arbitration factor.

21. An integrated circuit comprising:
one or more first agent circuits configured to generate memory transactions having a first type, wherein the one or more first agent circuits are configured to generate respective latency tolerance values that specify an estimated amount of data latency that respective first agent circuits are capable of experiencing without underrunning data and further configured to generate a requested bandwidth value;
a control circuit coupled to the one or more first agent circuits and configured to generate a current latency tolerance based on the respective latency tolerance values and a current requested bandwidth value based on the respective requested bandwidth values;
one or more second agent circuits configured to generate memory transactions having a second type;
one or more memory controllers configured to control one or more memory devices external to the integrated circuit; and
an interconnect fabric coupled to the one or more first agent circuits and the one or more second agent circuits, wherein the interconnect fabric is configured to provide up to a given bandwidth for memory transactions, wherein:
the one or more memory controllers comprise respective arbitration circuits configured to arbitrate among the memory transactions of the first type and the memory transactions of the second type;
the respective arbitration circuit employs an arbitration scheme in which a given traffic type has a given arbitration factor that affects a result of the arbitration scheme; and
the respective arbitration circuit of a given memory controller of the one or more memory controllers is configured to:
generate a bandwidth multiplier for the first type based on a comparison of the current latency tolerance to one or more thresholds; and
dynamically generate at least a first arbitration factor corresponding to the given traffic type based on the given bandwidth, the current requested bandwidth value, the current latency tolerance, and the bandwidth multiplier.

22. An integrated circuit comprising:
one or more first agent circuits configured to generate memory transactions having a first type, wherein the one or more first agent circuits are configured to generate respective latency tolerance values that specify an estimated amount of data latency that respective first agent circuits are capable of experiencing without underrunning data and further configured to generate a requested bandwidth value;
a control circuit coupled to the one or more first agent circuits and configured to generate a current latency tolerance based on the respective latency tolerance values and a current requested bandwidth value based on the respective requested bandwidth values;
one or more second agent circuits configured to generate memory transactions having a second type;
one or more memory controllers configured to control one or more memory devices external to the integrated circuit; and
an interconnect fabric coupled to the one or more first agent circuits and the one or more second agent circuits, wherein the interconnect fabric is configured to provide up to a given bandwidth for memory transactions, wherein:
the one or more memory controllers comprise respective arbitration circuits configured to arbitrate among the memory transactions of the first type and the memory transactions of the second type;
the respective arbitration circuit employs an arbitration scheme in which a given traffic type has a given arbitration factor that affects a result of the arbitration scheme;
the respective arbitration circuit is programmable with a margin value that accounts for potential inefficiency in bandwidth consumption by the one or more memory controllers; and
the respective arbitration circuit of a given memory controller of the one or more memory controllers is configured to dynamically generate at least a first arbitration factor corresponding to the given traffic type based on the given bandwidth, the current requested bandwidth value, and the current latency tolerance.

* * * * *